(12) United States Patent
Chaney

(10) Patent No.: US 12,317,775 B2
(45) Date of Patent: Jun. 3, 2025

(54) ROTARY MOWER SYSTEM AND METHOD OF ATTACHING A KNIFE TO A MOWER DISC THEREOF

(71) Applicant: DEERE & COMPANY, Moline, IL (US)

(72) Inventor: Nathan A. Chaney, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 767 days.

(21) Appl. No.: 17/650,404

(22) Filed: Feb. 9, 2022

(65) Prior Publication Data
US 2023/0247938 A1     Aug. 10, 2023

(51) Int. Cl.
*A01D 34/73* (2006.01)

(52) U.S. Cl.
CPC ......... *A01D 34/733* (2013.01); *A01D 34/736* (2013.01)

(58) Field of Classification Search
CPC ............................ A01D 34/733; A01D 34/736
See application file for complete search history.

(56) References Cited

U.S. PATENT DOCUMENTS

| | | | |
|---|---|---|---|
| 3,958,402 A | | 5/1976 | Bouet |
| 4,229,933 A | * | 10/1980 | Bernard ............... A01D 34/733 56/295 |
| 5,845,468 A | | 12/1998 | Richardson et al. |
| 6,311,463 B1 | | 11/2001 | Mellin et al. |
| 6,834,486 B2 | * | 12/2004 | Thompson ........... A01D 34/733 56/255 |
| 10,117,379 B2 | | 11/2018 | Guiet et al. |
| 10,412,884 B2 | | 9/2019 | Stephenson et al. |
| 2010/0101201 A1 | * | 4/2010 | Yanke .................. A01D 34/736 56/295 |

FOREIGN PATENT DOCUMENTS

| | | | | |
|---|---|---|---|---|
| FR | 2201821 A1 | * | 10/1973 | ............. A01D 55/22 |
| WO | WO 2012034872 A1 | | 3/2012 | |
| WO | WO-2014007688 A1 | * | 1/2014 | ........... A01D 34/733 |

OTHER PUBLICATIONS

Extended European Search Report and Written Opinion issued in European Patent Application No. 23152023.0, dated Jul. 24, 2023, in 05 pages.

* cited by examiner

*Primary Examiner* — Matthew Troutman
*Assistant Examiner* — Sunny D Webb

(57) ABSTRACT

A system for easily installing and removing a knife for a rotary mower system includes a mower disc having a body including an elongated slot. A retention block includes a pocket defining a radially outer portion and a radially inner portion. The retention block includes a cover portion covering the radially outer portion of the pocket and the elongated slot. A pin passes through the elongated slot and is moveable within the elongated slot along a radially extending path between the radially outer portion and the radially inner portion of the pocket. When the pin is disposed in the radially outer portion, the cover portion of the retention block covers the pin to prevent withdrawal of the pin from the elongated slot. When the pin is disposed in the radially inner portion, the pin may be removed from the elongated slot through an access opening.

24 Claims, 10 Drawing Sheets

ROTARY MOWER SYSTEM AND METHOD OF ATTACHING A KNIFE TO A MOWER DISC THEREOF

TECHNICAL FIELD

The disclosure generally relates to a rotary mower system and a method of attaching a knife to a mower disc of the rotary mower system

BACKGROUND

A rotary mower system includes a mower disc that rotates about a central axis of rotation. The central axis of rotation is arranged substantially vertical, such that the mower disc rotates on a substantially horizontal plane. The mower disc extends radially outward from the central axis of rotation to an outer peripheral edge of the mower disc. A knife is attached near the outer peripheral edge of the mower disc. Often, a pair of knives are attached opposite each other across the central axis of rotation. Rotation of the mower disc about the central axis of rotation imparts a centrifugal force to the knife, which biases the knife into a cutting position for cutting vegetation. When in the cutting position, the knife extends radially outward relative to the central axis of rotation. The knife may be attached to the mower disc in a manner that enables the knife to rotate relative to the mower disc in order to limit and/or reduce damage to the knife and/or the mower system in response to the knife striking a hard object, such as a rock or a stump. The knife is a wear item, which may need to be replaced periodically.

SUMMARY

A rotary mower system is provided. The rotary mower system includes a mower disc. The mower disc includes a body that is rotatable about a central axis of rotation. The body includes an upper surface and a lower surface positioned beneath and opposite the upper surface. The body extends radially outward from the central axis of rotation and defines an elongated slot passing therethrough. The elongated slot passes between the upper surface and the lower surface of the body. A retention block is attached to and rotatable with the body. The retention block includes a recessed surface positioned against the upper surface of the body. The recessed surface of the retention block cooperates with the upper surface of the body to define a pocket therebetween. The pocket includes a radially outer portion and a radially inner portion. The retention block includes a cover portion that at least partially covers the elongated slot over the radially outer portion of the pocket. A pin includes a shank portion passing through the elongated slot. The shank portion of the pin is moveable within the elongated slot along a radially extending path relative to the central axis of rotation, between the radially outer portion of the pocket and the radially inner portion of the pocket. The pin includes a head portion that is attached to the shank portion. The head portion is positioned within the pocket between the retention block and the body of the mower disc. When the head portion of the pin is disposed in the radially outer portion of the pocket, the cover portion of the retention block at least partially covers the head portion of the pin to prevent withdrawal of the pin from the elongated slot. When the pin is disposed in the radially inner portion of the pocket, the cover portion of the retention block does not cover the head portion of the pin, thereby allowing vertical movement of the pin and withdrawal of the pin from the elongated slot. A knife is positioned adjacent the lower surface of the body. The knife is coupled to the shank portion of the pin.

In one aspect of the disclosure, the elongated slot includes a long dimension and a short dimension. The long dimension of the elongated slot extends radially outward from the central axis of rotation and defines a first distance. The short dimension of the elongated slot extends perpendicular to the long dimension and generally orthogonal to the central axis of rotation. The short dimension of the elongated slot defines a second distance. The first distance of the long dimension of the elongated slot is greater than the second distance of the short dimension of the elongated slot.

In one aspect of the disclosure, the shank portion of the pin defines a diameter. The diameter of the shank portion of the pin is less than the second distance of the short dimension of the elongated slot. As such, the shank portion of the pin may pass freely through the elongated slot.

The head portion of the pin defines a head width. The head width is the maximum width of the head portion measured parallel to the short dimension of the elongated slot. The head width is greater than the second distance of the short dimension. As such, the head portion of the pin may not pass through the elongated slot, with a lower surface of the head portion resting on the upper surface of the body of the mower disc.

In one aspect of the disclosure, the retention block includes an access opening. The access opening extends from a top surface of the retention block to the recessed surface to provide vertical access to the pocket from above. The access opening includes an opening width that is greater than the head width of the head portion of the pin. As such, the head portion of the pin may pass through the access opening from above and into the pocket defined by the retention block.

In one aspect of the disclosure, the rotary mower system may include an upper plate that is moveably attached to the body. The upper plate is configured for pivotable movement between an engaged position and a disengaged position. When the upper plate is disposed in the engaged position, the upper plate covers the access opening from above. When the upper plate is disposed in the disengaged position, the upper plate exposes the access opening from above, thereby providing access to the access opening from above the mower disc.

In one implementation of the disclosure, the upper plate may include a protrusion. The protrusion may be shaped to nest within and penetrate into the access opening of the retention block when the upper plate is disposed in the engaged position. As such, a portion of the protrusion may extend into the radial inner portion of the pocket. The protrusion prevents movement of the head portion of the pin into the radially inner portion of the pocket, thereby retaining the head portion of the pin in the radially outer portion of the pocket. With the head portion of the pin secured in the radially outer portion of the pocket, with the retention block covering the head portion of the pin, the pin is prevented from dislodging from the elongated slot.

In one implementation of the disclosure, the upper plate may include a resilient spring steel plate. The resilient spring steel plate may be configured to return to an initial shape after bending. As such, the upper plate may be temporarily bent upward to remove the protrusion from the access opening, whereby the upper plate may be moved away from the retention block and into the disengaged position. The resiliency of the spring steel plate returns the upper plate to its initial shape. Additionally, the resiliency of the spring steel plate biases the upper plate downward onto the retention block to maintain the protrusion within the access opening.

In one implementation of the disclosure, the upper plate includes a planar portion having a plate thickness. A bushing is mounted to the planar portion of the upper plate. The bushing has a bushing thickness that is greater than the plate thickness such that the bushing stands proud of the planar portion. A first fastener passes through the planar portion and the bushing, and secures the upper plate relative to the body. Because the bushing stands proud of the planar portion of the upper plate, the first fastener does not bind the upper plate against the mower disc, thereby allowing the upper plate to rotate about an axis defined by the first fastener, relative to the mower disc. This enables movement of the upper plate between the engaged position and the disengaged position.

In one aspect of the disclosure, the pocket defines a pocket width. The pocket width is measured parallel to the short dimension of the elongated slot. The pocket width is greater than the head width of the head portion of the pin. As such, the head portion of the pin may move freely within the pocket along the radially extending path of the pin.

In one aspect of the disclosure, the rotary mower system may further include a lower support. The lower support is fixedly attached to the body of the mower disc adjacent and below the lower surface of the body. The lower support includes a knife support portion. The knife support portion is spaced vertically below the lower surface of the body. The knife is positioned between the body and the knife support portion of the lower support. The knife support portion may define a support recess. The support recess may extend completely through the lower support to define a through bore, or may include a blind bore that does not extend completely through the lower support. A distal end of the shank portion of the pin, opposite the head portion of the pin, may be disposed within the support recess when the pin is disposed in the radially outer portion of the pocket.

In one aspect of the disclosure, the knife includes a bore extending therethrough. The shank portion of the pin passes through the bore of the knife to secure the knife relative to the body. The distal end of the shank portion extends into the support recess of the lower support.

In one implementation, the support recess includes an elongated shape having a long dimension and a short dimension. The long dimension of the support recess extends radially outward from the central axis of rotation. The short dimension of the support recess extends perpendicular to the long dimension of the support recess, and is generally orthogonal to the central axis of rotation. The long dimension of the support recess is greater than the short dimension of the support recess. In one implementation, the long dimension of the support recess is less than the long dimension of the elongated slot. In one implementation of the disclosure, the shank portion of the pin defines a diameter that is less than the short dimension of the support recess. In another implementation of the disclosure, the short dimension of the elongated slot is approximately equal to the short dimension of the support recess.

A method of attaching a knife to a mower disc of a rotary mower system is also provided. The mower disc includes a body rotatable about a central axis of rotation. The method includes providing the mower disc with an elongated slot and a retention block. The elongated slot passes through the body of the mower disc between an upper surface and a lower surface of the body. The retention block is attached to and rotatable with the body. The retention block includes a recessed surface positioned against the upper surface of the body of the mower disc. The recessed surface cooperates with the upper surface of the body to define a pocket therebetween. The pocket includes a radially outer portion relative to the central axis of rotation that at least partially covers the elongated slot, and a radially inner portion relative to the central axis of rotation that does not cover the elongated slot. A knife is positioned between the lower surface of the body and a lower support. The lower support is attached to the body, such that a bore of the knife is aligned with the elongated slot and a support recess of the lower support. A pin is inserted through an access opening of the retention block and through the elongated slot until a head portion of the pin rests against the upper surface of the body, whereby a shank portion of the pin passes through the bore of the knife and at least partially penetrates into the support recess of the lower support. The pin is moved relative to the body in a direction radially outward and away from the central axis of rotation, so that the head portion of the pin is disposed in the radially outer portion of the pocket such that the retention block at least partially covers the head portion of the pin to prevent withdrawal of the pin from the elongated slot. Movement of the pin along the elongated slot in a direction radially inward and toward the central axis of rotation is blocked after the head portion is disposed in the radially outer portion of the pocket, to secure the pin relative to the body.

In one aspect of the method described herein, the shank portion of the pin is aligned relative to the retention block, such that the shank portion forms an insertion angle relative to the central axis of rotation and is positioned to pass through the access opening of the retention block and through the radially inner portion of the pocket at the insertion angle. Prior to moving the pin into the radially outer portion of the pocket, and once the pin is positioned with the shank portion passing through the elongated slot of the body, the bore of the knife, and the support recess of the lower support, the pin is rotated from the insertion angle to be substantially parallel the central axis of rotation.

In one aspect of the method described herein, an upper plate of the rotary mower system may be bent vertically upward and away from the mower disc to dislodge a protrusion of the upper plate from interlocking engagement with the access opening of the retention block disposed on the mower disc. When the protrusion is dislodged from the access opening, the upper plate may be moved relative to the mower disc to provide access to the access opening from above.

In one implementation of the method described herein, the step of blocking movement of the pin along the elongated slot in the direction radially inward and toward the central axis of rotation includes moving the upper plate relative to the mower disc so that the protrusion is aligned with the access opening. A spring force inherent in the upper plate biases the protrusion into interlocking engagement with the access opening and blocks movement of the pin toward the central axis of rotation.

Accordingly, rotary mower system and method described herein provides a simple and easy system/process to installing/removing the knife. During operation, centrifugal forces generated by rotation of the mower disc about the central axis of rotation move the pin radially outward into the radially outer portion of the pocket, which blocks vertical movement of the pin to prevent the pin from being dislodged from the elongated slot. When the upper plate is disposed in the engaged position, the protrusion in the upper plate blocks radial movement of the pin to maintain in the radially outer portion of the pocket. The knife may be changed by simply bending the upper plate upward so that the protrusion is dislodged form the access opening, and then rotating the upper plate into the disengaged position. The knife and the pin may then be moved radially inward so that the pin aligns with the access opening and then moved vertically upward out of the elongated slog to disengage the knife. In order to install the knife, the upper plate may be bent upward and rotated into the disengaged position. The bore of the knife is aligned with the elongated slot, and the pin inserted through the access opening at the insertion angle, and thereafter rotated into the vertical position. Once rotated into the vertical position, the pin may be moved radially outward relative to the central axis of rotation and the upper plate moved back into the engaged position to secure the knife relative to the mower disc.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
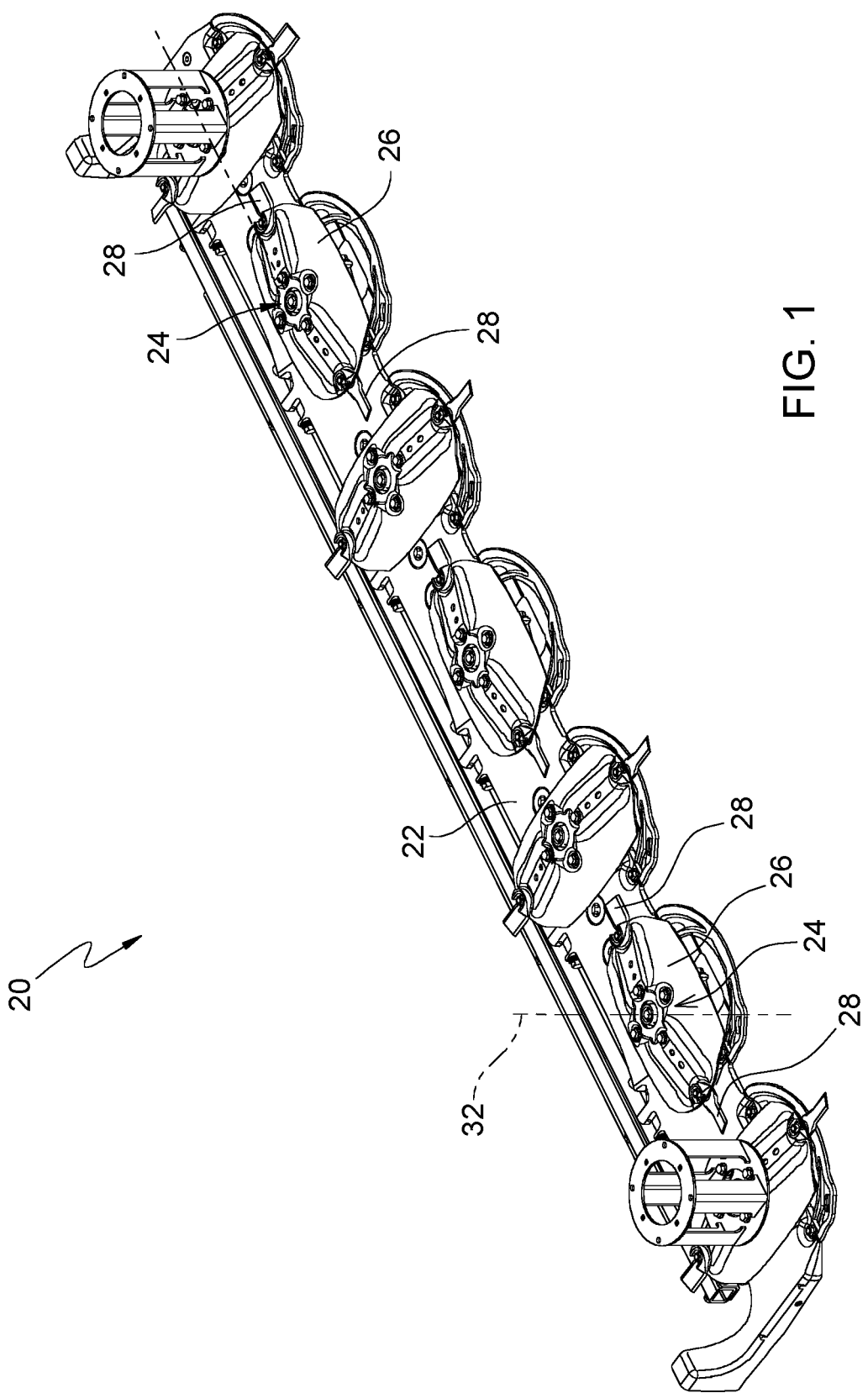
FIG. 1 is a schematic perspective view of a rotary mower system.

Referring to the Figures, wherein like numerals indicate like parts throughout the several views, an example implementation of a rotary mower system is generally shown at 20 in FIG. 1. The example implementation of the rotary mower system 20 shown in FIG. 1 is configured to include a cutter bar 22 having a plurality of cutting modules 24 typically used for cutting hay and/or other forage materials. However, it should be appreciated that the rotary mower system 20 may be configured differently than the example implementation shown in FIG. 1. For example, the rotary mower system 20 may alternatively be configured with only a single cutting module 24 for cutting brush material. It should be appreciated that the teachings of this disclosure may be applied to many different configurations of the rotary mower system 20, other than those mentioned herein.

Referring to FIG. 1, each of the cutting modules 24 of the rotary mower system 20 includes a mower disc 26 having at least one knife 28 attached thereto. In the example implementation, each mower disc 26 includes a pair of opposing knives 28 attached to their respective mower disc 26. However, it should be appreciated that the number of knives 28 of each cutting module 24 may vary, and that each cutting module 24 may be configured with any number of knives 28, i.e., one or more knives 28 per cutting module 24. A single cutting module 24 is described in detail below.

Referring to FIGS. 2-10, the mower disc 26 includes a body 30. The body 30 is rotatable about a central axis of rotation 32. The rotary mower system 20 includes a drive system (not shown) operable to rotate the body 30 about the central axis of rotation 32 for cutting/mowing crop material and/or vegetation. The specific features and operation of the drive system are not pertinent to the teachings of this disclosure, are understood by those skilled in the art, and are therefore not described in greater detail herein.

The body 30 extends radially outward from the central axis of rotation 32 to an outer peripheral edge 34, and may generally include a plate structure. The body 30 includes a central portion 36 disposed near the central axis of rotation 32, and a flange portion 38 disposed proximate the outer peripheral edge 34. In one implementation, the flange portion 38 is substantially perpendicular to the central axis of rotation 32. The body 30 includes an upper surface 40 and a lower surface 42 positioned beneath and opposite the upper surface 40. As used herein, the terms upper, top, above, lower, beneath, bottom refer to a relative position along the central axis of rotation 32 when the rotary mower system 20 is positioned for operation. When positioned for operation, the lower surface 42 of the body 30 is positioned to face a ground surface, with the upper surface 40 of the body 30 generally facing skyward. As such, the upper surface 40 of the body 30 is disposed vertically above the lower surface 42 of the body 30 during operation.

Figure 6:
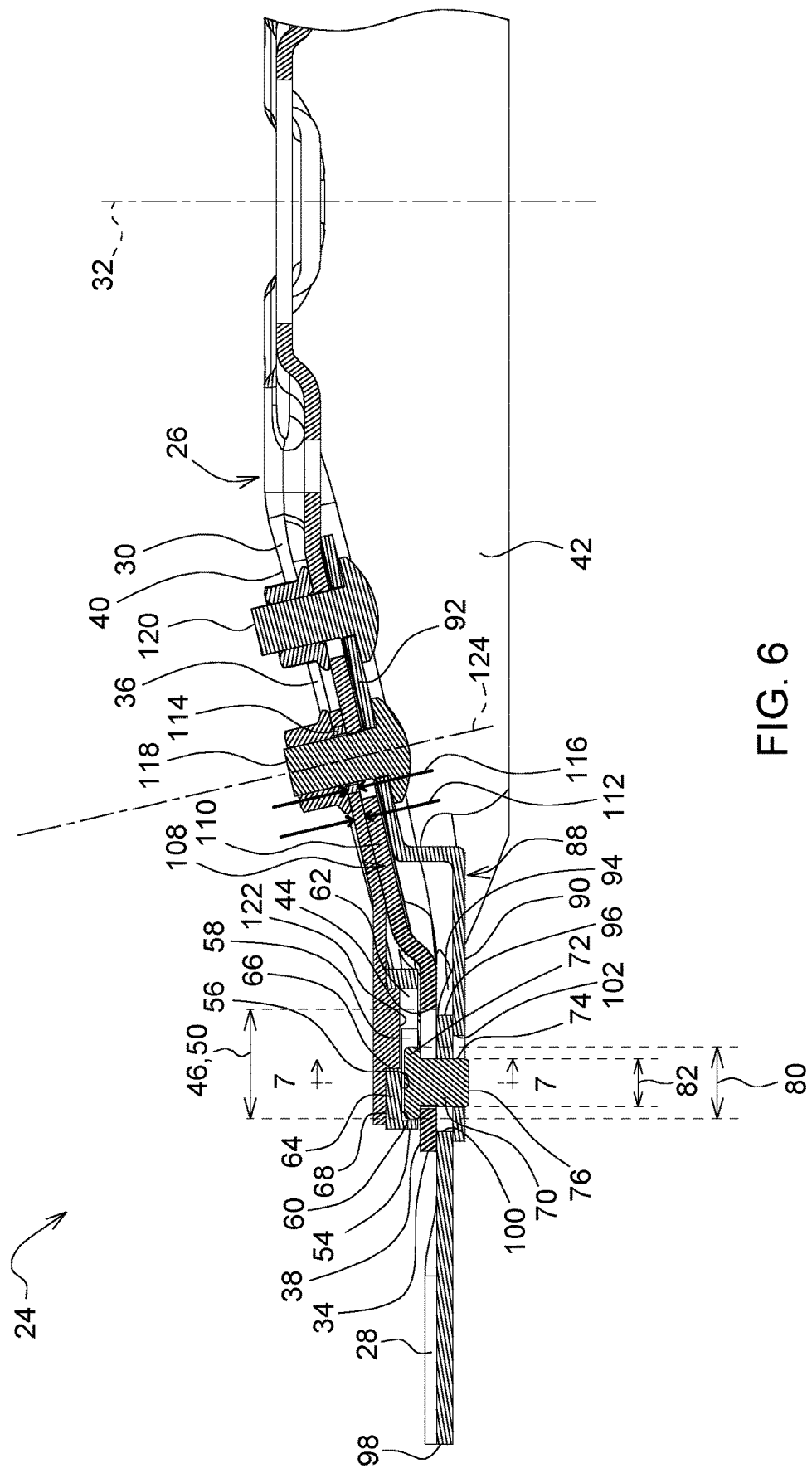
FIG. 6 is a schematic cross-sectional view of the mower disc along a long dimension of an elongated slot of the mower disc showing a pin in a radially outer portion of the elongated slot.
Figure 7:
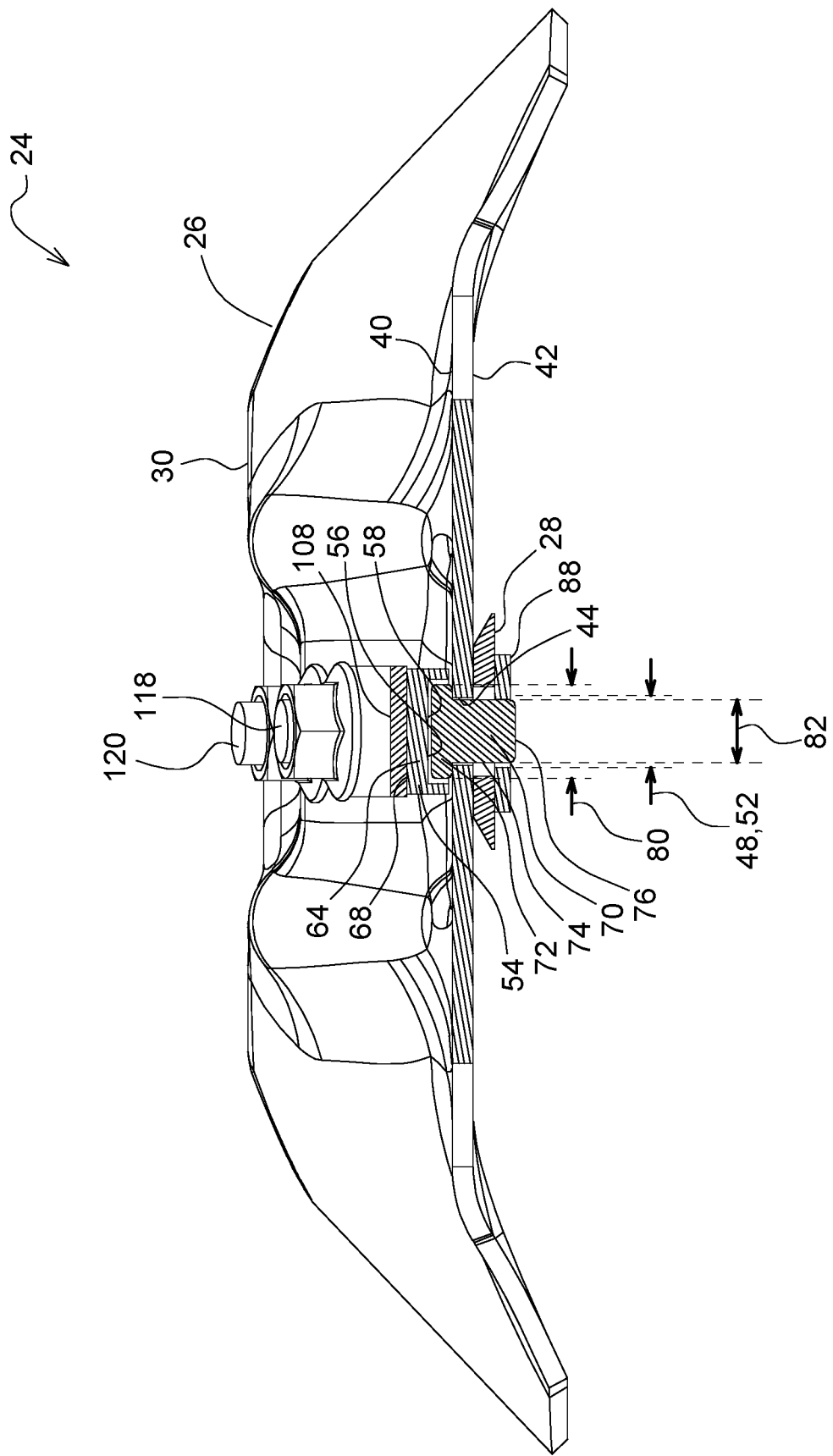
FIG. 7 is a schematic cross-sectional view of the mower disc along cut line 7-7 shown in FIG. 6.
Figure 8:
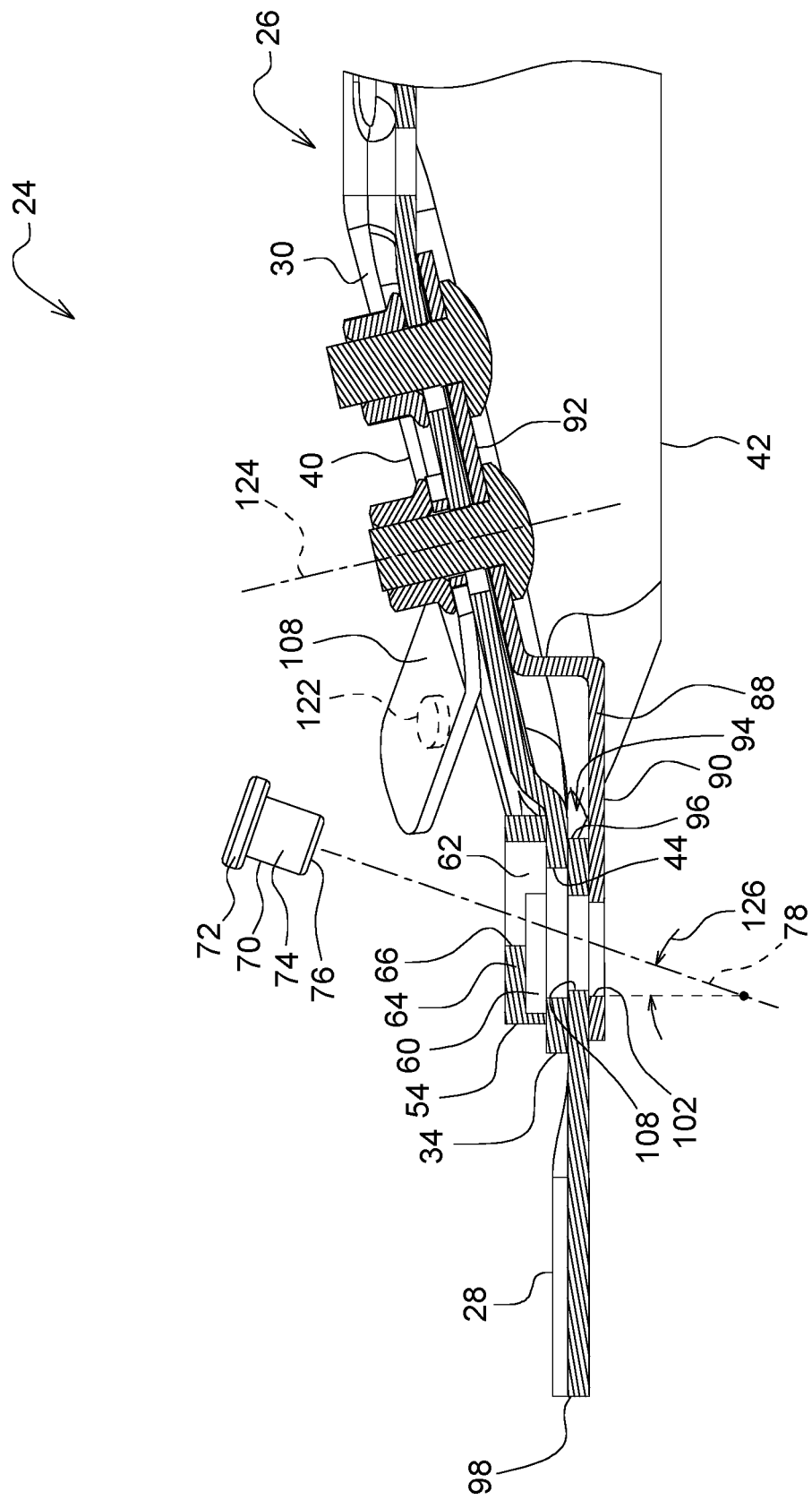
FIG. 8 is a schematic cross-sectional view of the mower disc showing a pin aligned for installation.

The body 30 defines an elongated slot 44. The elongated slot 44 passes through the body 30 in a direction parallel with the central axis of rotation 32, between the upper surface 40 and the lower surface 42 of the body 30. As best shown in FIGS. 6 and 7, the elongated slot 44 includes a long dimension 46 and a short dimension 48. The long dimension 46 of the elongated slot 44 extends radially relative to the central axis of rotation 32 and is generally perpendicular to the central axis of rotation 32. The short dimension 48 of the elongated slot 44 is located on a common plane with the long dimension 46 of the elongated slot 44 and is perpendicular to the long dimension 46. The long dimension 46 of the elongated slot 44 defines a first distance 50. The short dimension 48 of the elongated slot 44 defines a second distance 52. The first distance 50 of the long dimension 46 of the elongated slot 44 is greater than the second distance 52 of the short dimension 48 of the elongated slot 44. As such, the longest dimension of the elongated slot 44, i.e., the long dimension 46, extends radially relative to the central axis of rotation 32, i.e., away from and/or toward the central axis of rotation 32.

A retention block 54 is attached to and rotatable with the body 30. The retention block 54 is positioned above the elongated slot 44, proximate the outer peripheral edge 34 of the body 30. The retention block 54 is fixedly secured relative to the body 30. The retention block 54 may be cast and/or integrally formed with the body 30, or may be securely attached to the body 30, such as by welding, fasteners, permanent adhesives, etc.

As best shown in FIGS. 6 and 7, the retention block 54 includes a recessed surface 56 that is positioned against the upper surface 40 of the body 30. The recessed surface 56 of the retention block 54 cooperates with the upper surface 40 of the body 30 to define a pocket 58 therebetween. The pocket 58 is generally aligned with and disposed over and above the elongated slot 44. The pocket 58 includes a radially outer portion 60 and a radially inner portion 62. The radially outer portion 60 of the pocket 58 is disposed farther from the central longitudinal axis than the radially inner portion 62 of the pocket 58. The retention block 54 includes a cover portion 64 that partially covers the pocket 58 and the elongated slot 44 over the radially outer portion 60 of the pocket 58. As such, the cover portion 64 is positioned vertically above the radially outer portion 60 of the pocket 58. The cover portion 64 does not cover the radially inner portion 62 of the pocket 58.

Figure 5:
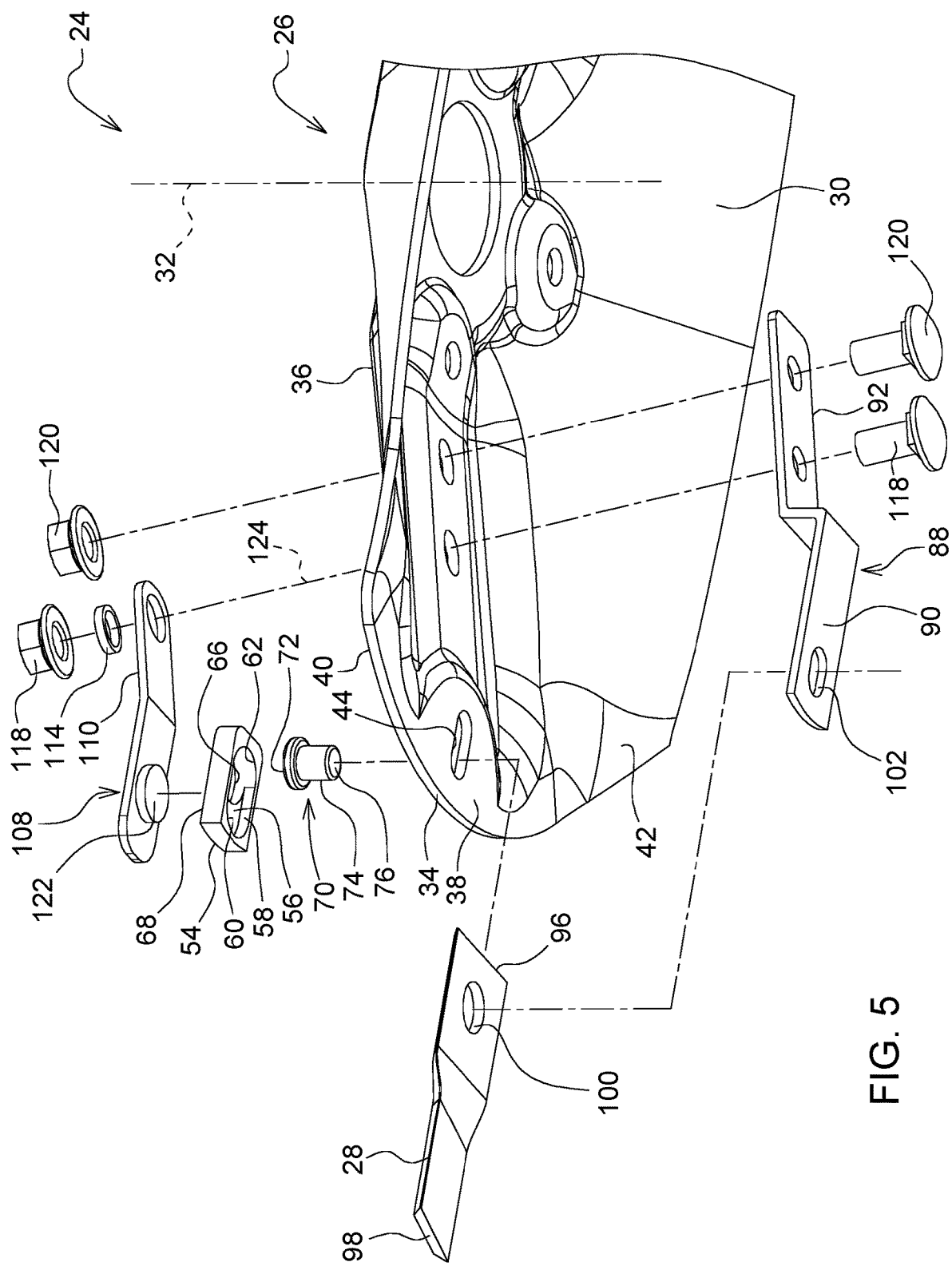
FIG. 5 is a schematic exploded perspective view from below of the mower disc.

As best shown in FIGS. 5 and 6, the retention block 54 includes an access opening 66. The access opening 66 extends from a top surface 68 of the retention block 54 to the recessed surface 56 of the retention block 54 to provide vertical access to the pocket 58 from above. As such, the radially inner portion 62 of the pocket 58 is open from above through the access opening 66.

Referring to FIGS. 2-10, the rotary mower system 20 includes a pin 70 for securing the knife 28 to the mower disc 26. The pin 70 includes a head portion 72 and a shank portion 74 extending from the head portion 72 to a distal end 76 of the shank portion 74. The shank portion 74 passes through the elongated slot 44, with the head portion 72 of the pin 70 resting on the upper surface 40 of the body 30. The shank portion 74 of the pin 70 is moveable within the elongated slot 44 along a radially extending path 78 relative to the central axis of rotation 32. The pin 70, and particularly the head portion 72 of the pin 70, is moveable between the radially outer portion 60 of the pocket 58 and the radially inner portion 62 of the pocket 58.

The head portion 72 of the pin 70 is positioned within the pocket 58 between the retention block 54 and the body 30 of the mower disc 26. When the pin 70 is disposed in the radially outer portion 60 of the pocket 58, the cover portion 64 of the retention block 54 at least partially covers the head portion 72 of the pin 70 to prevent withdrawal or dislodgement of the pin 70 from the elongated slot 44. When the pin 70 is disposed in the radially inner portion 62 of the pocket 58, the cover portion 64 of the retention block 54 does not cover the head portion 72 of the pin 70, thereby allowing vertical upward movement and withdrawal of the pin 70 from the elongated slot 44.

The head portion 72 of the pin 70 defines a head width 80. In one implementation, the head width 80 is arranged generally parallel to the short dimension 48 of the elongated slot 44. The largest measurement or extend of the head width 80 of the pin 70 is greater than the second distance 52 of the short dimension 48 of the elongated slot 44. As such, the head portion 72 of the pin 70 is unable to pass through the elongated slot 44. The shank portion 74 of the pin 70 defines a diameter 82 that is less than the head width 80 of the head portion 72 of the pin 70. The diameter 82 of the shank portion 74 of the pin 70 is less than the second distance 52 of the short dimension 48 of the elongated slot 44. As such, the shank portion 74 of the pin 70 is able to pass through the elongated slot 44.

The shank portion 74 of the pin 70 may include a circular cross-sectional shape, or a polygonal cross-sectional shape. The diameter 82 of the shank portion 74 may include a distance measured across the cross-sectional shape of the shank portion 74 of the pin 70, whether circular or polygonal. For example, if the shank portion 74 is configured to include a square cross-sectional shape, then the diameter 82 of the shank portion 74 should be interpreted to include a width of the square cross-sectional shape.

Figure 10:
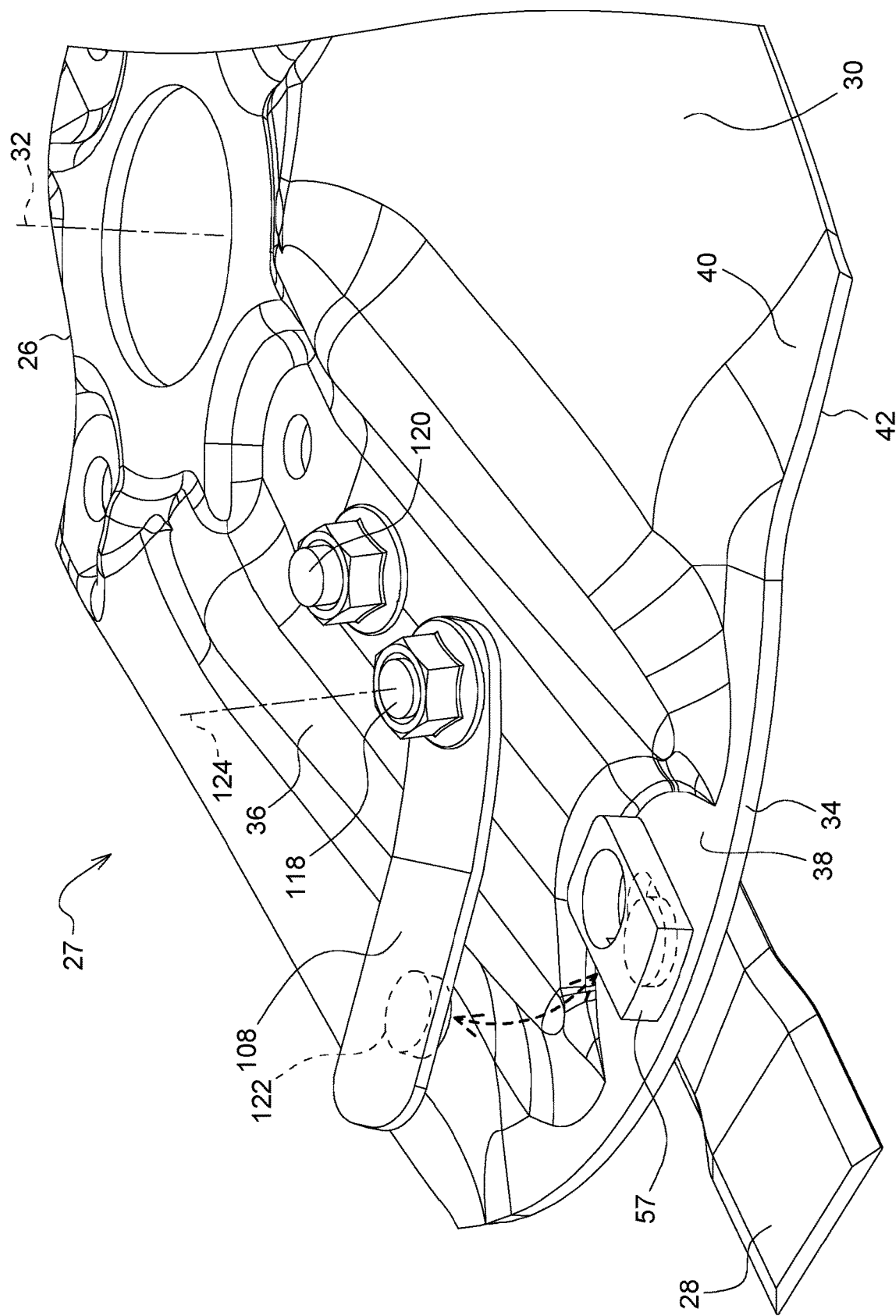
FIG. 10 is a schematic perspective view from above of the mower disc showing the upper plate in a disengaged position.

As best shown in FIGS. 7 and 10, the pocket 58 defines a pocket width parallel to the short dimension 48 of the elongated slot 44. The pocket width is greater than the head width 80 of the head portion 72 of the pin 70. As such, the head portion 72 of the pin 70 fits within the pocket 58. The access opening 66 of the retention block 54 includes an opening width that is greater than the head width 80 of the head portion 72 of the pin 70. As such, the head portion 72 of the pin 70 may pass through the access opening 66 of the retention block 54, and into the pocket 58.

Referring to FIGS. 2-10, a lower support 88 is fixedly attached to the body 30 of the mower disc 26. The lower support 88 is positioned adjacent and below the lower surface 42 of the body 30. In the example implementation shown in the Figures and described herein, the lower support 88 includes a knife support portion 90 and a mount portion 92. The mount portion 92 is fixedly attached to the body 30 of the mower disc 26. The mount portion 92 may be attached to the body 30 in a suitable manner, such as but not limited to, a welded connection, a bolted connection, a permanent adhesive, etc. The knife support portion 90 is spaced vertically below the lower surface 42 of the body 30 to define a gap 94 therebetween. The knife 28 is positioned adjacent to the lower surface 42 of the body 30, between the body 30 and the knife support portion 90 of the lower support 88. While the example implementation shown in the Figures and described herein includes the lower support 88 as a separate component fixedly attached to the body 30 of the mower disc 26, it should be appreciated that in other implementations, the lower support 88 may be integrally formed with the mower disc 26.

As is understood by those skilled in the art, the knife 28 is rotatably attached to the mower disc 26 proximate a first end 96 of the knife 28. Centrifugal force from rotation of the mower disc 26 about the central axis of rotation 32 urges a distal second end 98 of the knife 28 radially outward, causing the knife 28 to straighten and resist movement relative to the mower disc 26, which provides the resistance against which crop material and/or vegetation are cut. The specific details, construction, and operation of the knife 28 are understood by those skilled in the art, are not pertinent to the teachings of this disclosure, and are therefore not described in greater detail herein.

The knife 28 is secured to the mower disc 26 via the pin 70. More particularly, the knife 28 is coupled to the shank portion 74 of the pin 70. The knife 28 includes a bore 100 extending therethrough. The shank portion 74 of the pin 70 passes through the bore 100 of the knife 28 to secure the knife 28 relative to the body 30.

The knife support portion 90 of the lower support 88 may define a support recess 102. The example implementation shown in the Figures includes the support recess 102 configured as a through bore 100 extending completely through the knife support portion 90 of the support. However, the support recess 102 may be configured differently than the example implementation. For example, the support recess 102 may alternatively be configured as blind bore 100, which only partially extends into the knife support portion 90 of the lower support 88. The distal end 76 of the shank portion 74 of the pin 70 is disposed within the support recess 102 when the pin 70 is disposed in the radially outer portion 60 of the pocket 58.

In the example implementation shown in the Figures and described herein, the support recess 102 is configured to include an elongated shape. However, it should be appreciated that the support recess 102 may be configured differently than the example implementation described herein. As best shown in FIGS. 6 and 7, the elongated shape of the support recess 102 includes a long dimension and a short dimension. The long dimension of the support recess 102 extends radially outward from the central axis of rotation 32. The short dimension of the support recess 102 extends perpendicular to the long dimension of the support recess 102. The long dimension of the support recess 102 is greater than the short dimension of the support recess 102. The long dimension 46 of the elongated slot 44 may be greater than the long dimension of the support recess 102. The short dimension 48 of the elongated slot 44 may be approximately equal to the short dimension of the support recess 102.

The diameter 82 of the shank portion 74 of the pin 70 is less than the short dimension of the support recess 102. As such, the shank portion 74 of the pin 70 may pass through the support recess 102. The pin 70 may be moveable within the support recess 102 as the head portion 72 of the pin 70 moves between the radially inner portion 62 of the pocket 58 and the radially outer portion 60 of the pocket 58.

Referring to FIGS. 2-10, the rotary mower system 20 may further include an upper plate 108. The upper plate 108 is moveably attached to the body 30 for movement between an engaged position, best shown in FIG. 2, and a disengaged position, best shown in FIG. 10. When the upper plate 108 is disposed in the engaged position, the upper plate 108 covers the access opening 66 of the retention block 54, thereby covering the radially inner portion 62 of the pocket 58. When the upper plate 108 is disposed in the disengaged position, the upper plate 108 does not cover the access opening 66 of the retention block 54, thereby allowing access to the pocket 58 through the access opening 66 from above.

In the example implementation shown in the Figures and described herein, the upper plate 108 includes resilient spring steel plate that is rotatably attached to the body 30 of the mower disc 26. As used herein, the term "resilient" is defined as "able to recoil or spring back into shape after bending, stretching, or compressing". As such the upper plate 108 is configured and/or able to spring back into an original or initial shape in response to bending, stretching, or compression of a component or portion thereof.

Figure 2:
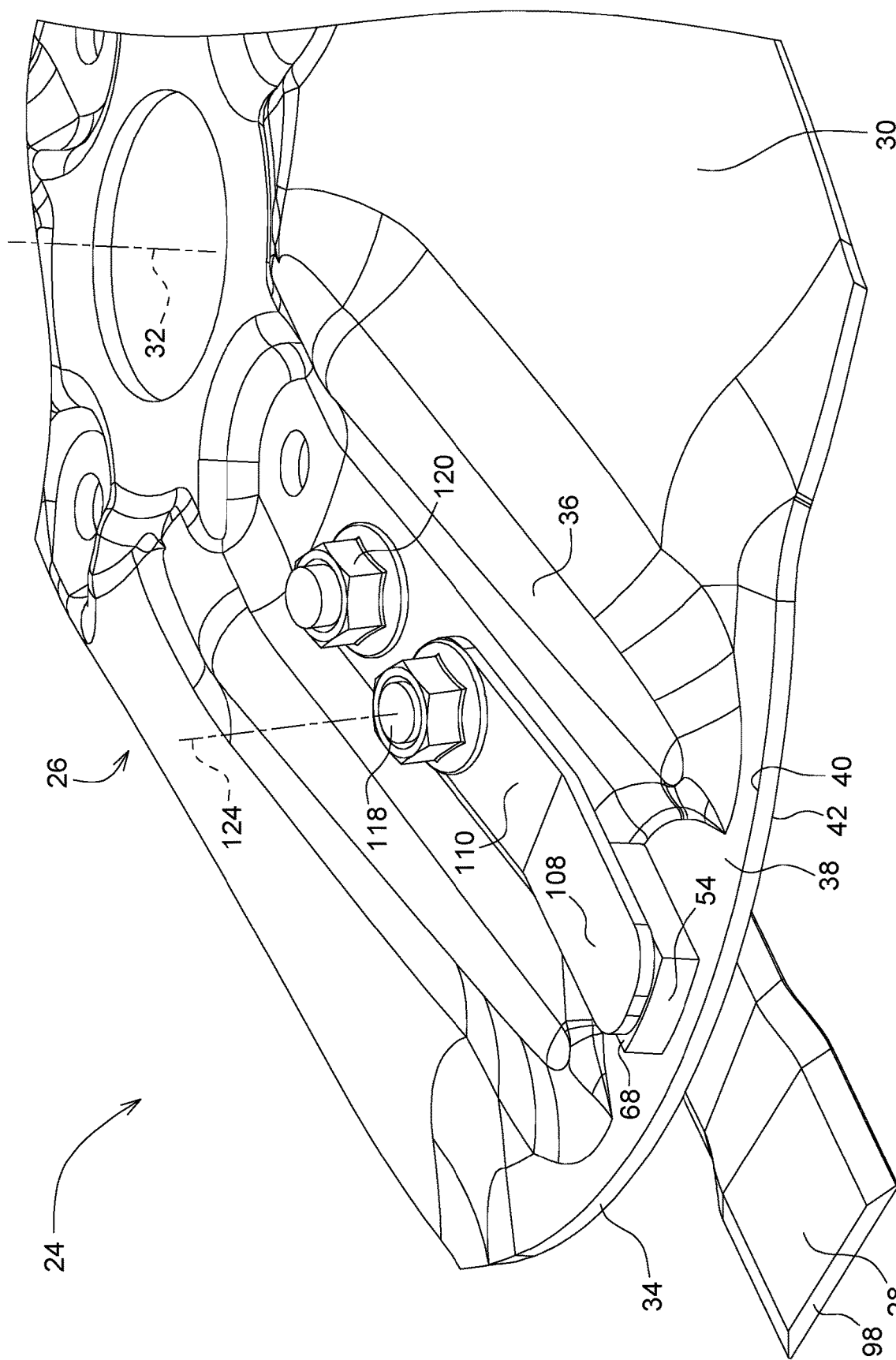
FIG. 2 is a schematic perspective view from above of a mower disc of the rotary mower system showing an upper plate in an engaged position.
Figure 3:
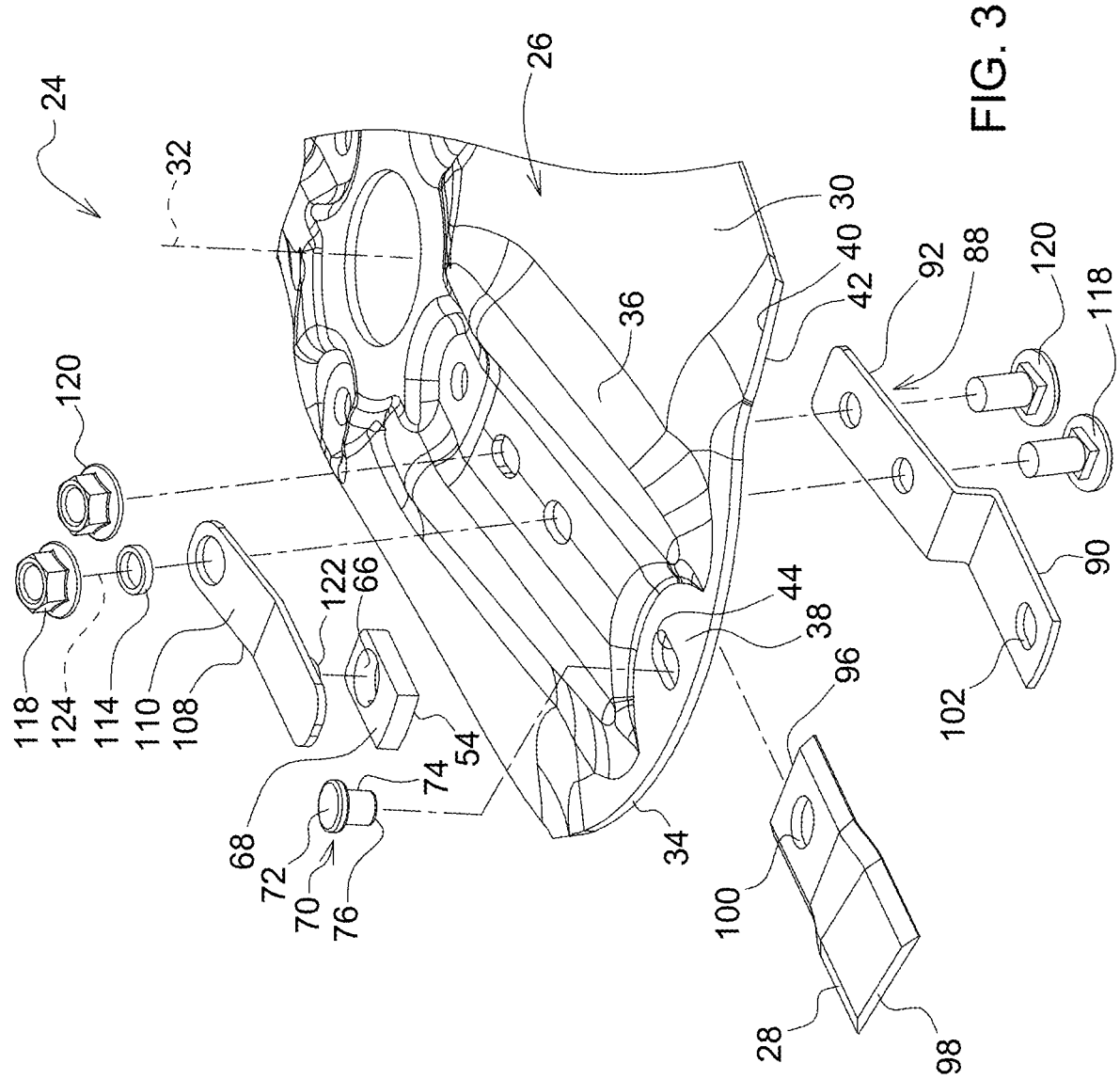
FIG. 3 is a schematic exploded perspective view from above of the mower disc.
Figure 4:
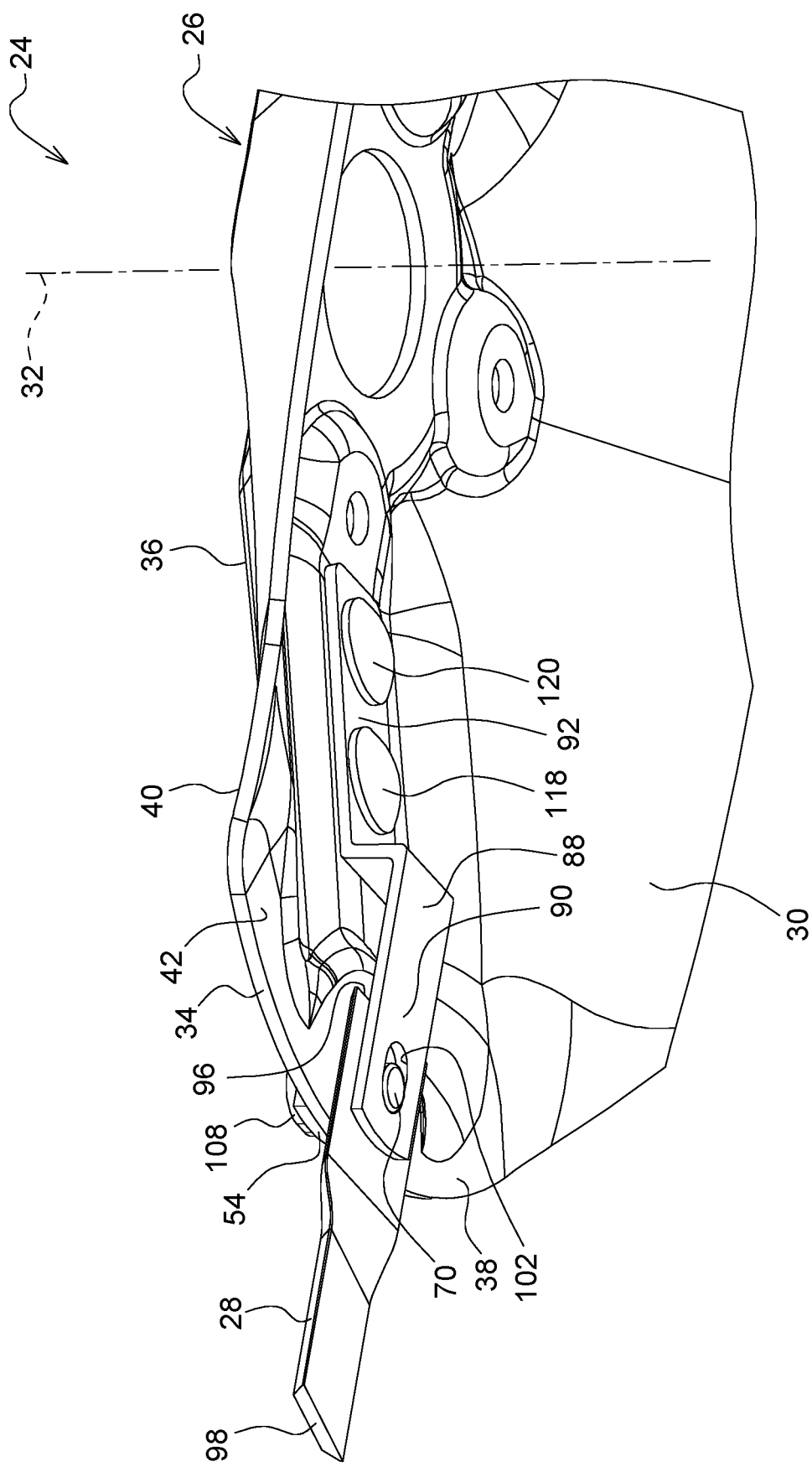
FIG. 4 is a schematic perspective view from below of the mower disc.

In the example implementation shown in the Figures and described herein, the upper plate 108 is rotatably attached for pivotal or rotational movement relative to the body 30, between the engaged position, best shown in FIG. 2, and the disengaged position, best shown in FIG. 10. The upper plate 108 includes a planar portion 110 having a plate thickness 112, and a bushing 114 seated within the planar portion 110 and having a bushing thickness 116. The bushing thickness 116 of the bushing 114 is greater than the plate thickness 112 of the planar portion 110 of the upper plate 108, such that the bushing 114 stands proud of the planar portion 110. A first fastener 118 passes through the planar portion 110 and the bushing 114, and is secured relative to the body 30. In the example implementation shown in the Figures and described herein, the first fastener 118 attaches both the upper plate 108 and the lower support 88 to the mower disc 26. A second fastener 120 further attaches the lower support 88 to the mower disc 26. The upper plate 108 may rotate relative to the body 30 of the mower disc 26 about an axis defined by the first fastener 118. Because the bushing 114 stands proud of the planar portion 110 of the upper plate 108, the upper plate 108 is not pinched or bound by the first fastener 118, and is thereby allowed to rotate between the engaged position and the disengaged position. It should be appreciated that the upper plate 108 and the manner of attachment to the mower disc 26 may differ from the example implementation shown in the figures and described herein.

As best shown in FIG. 6, the upper plate 108 may include a protrusion 122. The protrusion 122 may be shaped to nest within and penetrate into the access opening 66 of the retention block 54. The protrusion 122 may further penetrate into the radially inner portion 62 of the pocket 58. When the upper plate 108 is disposed in the engaged position, the protrusion 122 may be engaged within the access opening 66. The protrusion 122 is withdrawn from the access opening 66 when the upper plate 108 is disposed in the disengaged position.

A method of attaching the knife 28 to the mower disc 26 is also provided. The method includes providing the mower disc 26 to include the elongated slot 44 and the retention block 54 described above. In order to install the knife 28, the upper plate 108 is bent vertically upward and away from the mower disc 26. Bending the upper plate 108 upward and away from the mower disc 26 dislodges the protrusion 122 of the upper plate 108 from interlocking engagement with the access opening 66 of the retention block 54. Once the protrusion 122 is dislodged from the access opening 66 of the retention block 54, the upper plate 108 may be moved relative to the mower disc 26, from the engaged position into the disengaged position, such as shown in FIG. 10. Moving the upper plate 108 into the disengaged position provides access to the access opening 66 from above the mower disc 26. The upper plate 108 may be moved from the engaged position to the disengaged position by rotating the upper plate 108 about an axis 124 defined by the first fastener 118.

With the upper plate 108 disposed in the disengaged position, the knife 28 may be positioned between the lower surface 42 of the body 30 and the lower support 88 attached to the body 30. When properly positioned, the bore 100 of the knife 28 is aligned with the elongated slot 44 of the mower disc 26 and the support recess 102 of the lower support 88.

With the knife 28 properly positioned, the shank portion 74 of the pin 70 may be aligned relative to the retention block 54. In the example implementation described herein, with reference to FIG. 8, the shank portion 74 is aligned to form an insertion angle 126 relative to the central axis of rotation 32. The shank is aligned to pass through the radially inner portion 62 of the pocket 58 at the insertion angle 126.

The insertion angle 126 may vary. In one implementation, the insertion angle 126 may include an angle between twenty degrees (20°) and seventy degrees (70°). The pin 70 is positioned to pass through the access opening 66 of the retention block 54, the radially inner portion 62 of the pocket 58, the elongated slot 44, the bore 100 of the knife 28, and the support recess 102 of the lower support 88.

Figure 9:
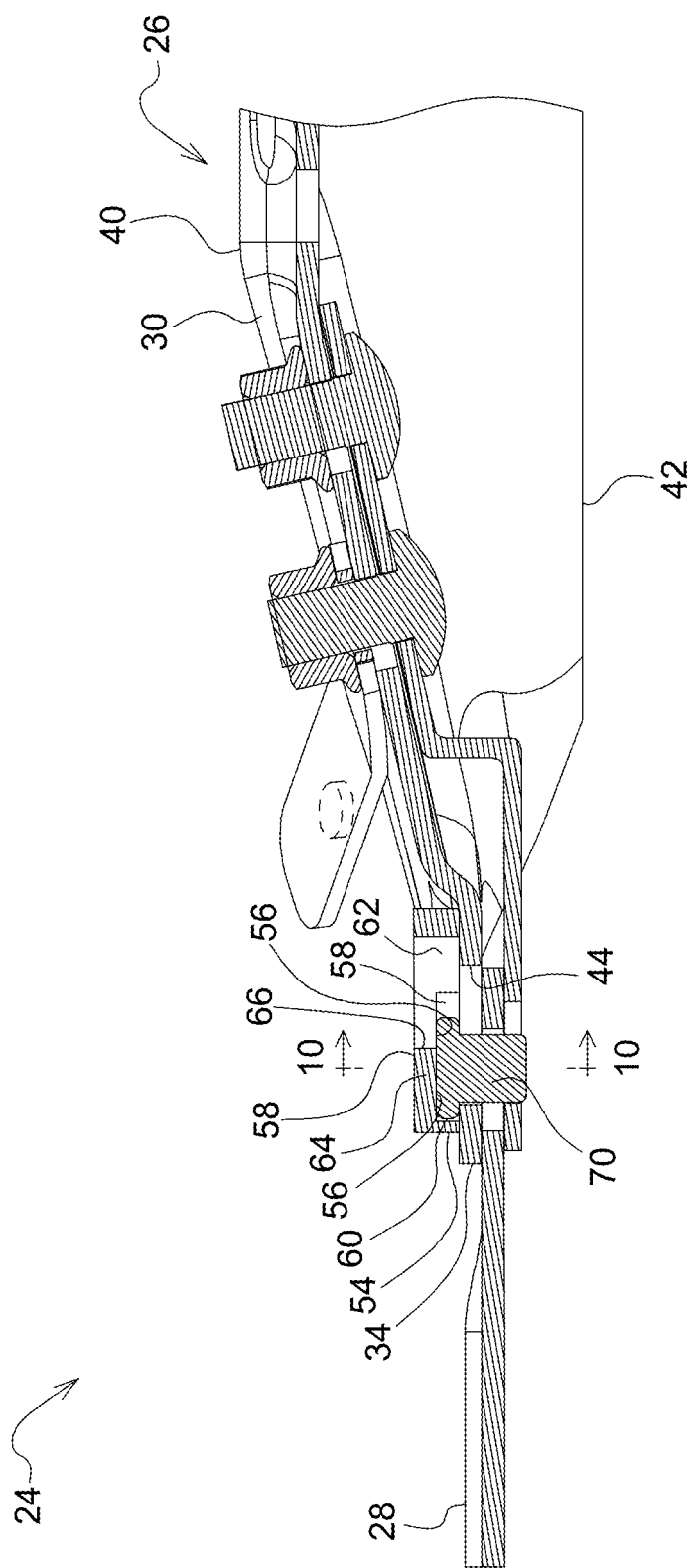
FIG. 9 is a schematic cross-sectional view of the mower disc along the long dimension of the elongated slot of the mower disc showing the pin in a radially inner portion of the elongated slot.

Once the pin 70 is properly aligned, the pin 70 may be inserted through the access opening 66 of the retention block 54, the radially inner portion 62 of the pocket 58, the elongated slot 44, and the bore 100 of the knife 28 until the head portion 72 of the pin 70 contacts the upper surface 40 of the body 30. In the example implementation described herein, because the shank portion 74 of the pin 70 is aligned at the insertion angle 126, the head portion 72 of the pin 70 will not rest flat against the upper surface 40 of the body 30 when the pin 70 is initially inserted through the elongated slot 44. Rather, once the head portion 72 of the pin 70 contacts the upper surface 40 of the body 30, the pin 70 may be rotated from the insertion angle 126 to vertical position in which the shank portion 74 of the pin 70 is substantially parallel the central axis of rotation 32. Once the pin 70 is disposed in the vertical position, such as shown in FIG. 9, the head portion 72 of the pin 70 may substantially rest flat against the upper surface 40 of body 30 of the mower disc 26 proximate the radially inner portion 62 of the pocket 58. Additionally, once the pin 70 is rotated into the vertical position, the distal end 76 of the shank portion 74 will extend into or at least partially penetrate into the support recess 102 of the lower support 88.

While the example implementation described herein includes aligning the pin 70 at the insertion angle 126 and rotating the pin 70 from the insertion angle 126 into the vertical position, it should be appreciated that in other embodiments, the pin 70 may be initially aligned in a vertical orientation, i.e., parallel with the central axis of rotation 32, and inserted through the access opening 66 of the retention block 54, the radially inner portion 62 of the pocket 58, the elongated slot 44, and the bore 100 of the knife 28, and into the support recess 102 by simply moving the pin 70 vertically downward, thereby eliminating the need to rotate the pin 70 from the insertion angle 126 into the vertical position.

Once the pin 70 is arranged in the vertical position, with the head portion 72 disposed in the radially inner portion 62 of the pocket 58, and with the shank portion 74 extending through the elongated slot 44 of the mower disc 26, the bore 100 of the knife 28, and into the support recess 102 of the lower support 88, the pin 70 is then moved relative to the body 30 of the mower disc 26 in a direction radially outward and away from the central axis of rotation 32. The pin 70 is moved radially outward so that the head portion 72 of the pin 70 is disposed in the radially outer portion 60 of the pocket 58, such as shown in FIG. 6. With the head portion 72 of the pin 70 disposed in the radially outer portion 60 of the pocket 58, the cover portion 64 of the retention block 54 at least partially covers the head portion 72 of the pin 70 to prevent upward vertical movement and withdrawal of the pin 70 from the elongated slot 44.

With the head portion 72 of the pin 70 disposed in the radially outer portion 60 of the pocket 58, movement of the pin 70 along the elongated slot 44 in a direction radially inward and toward the central axis of rotation 32 may be blocked to secure the pin 70 relative to the body 30. With movement of the pin 70 in the inward radial direction blocked, the head portion 72 of the pin 70 is unable to move into the radially inner portion 62 of the pocket 58, and therefore cannot be removed from the pocket 58.

Blocking movement of the pin 70 along the elongated slot 44 in the direction radially inward and toward the central axis of rotation 32 may include moving the upper plate 108 from the disengaged position, shown in FIG. 10, into the engaged position, shown in FIG. 2. The upper plate 108 is moved relative to the mower disc 26 so that the protrusion 122 is aligned with the access opening 66. It should be appreciated that moving the upper plate 108 from the disengaged position into the engaged position may include bending the upper plate 108 vertical upward so that the protrusion 122 of the upper plate 108 clears the retention block 54 and then rotating the upper plate 108 until the protrusion 122 is aligned above the access opening 66 in the retention block 54. A downward spring force generated by bending the upper plate 108 vertically upward may then bias the upper plate 108 downward and move the protrusion 122 into interlocking engagement with the access opening 66. With the upper plate 108 covering the access opening 66 and the protrusion 122 disposed in the access opening 66 and/or extending into the radially inner portion 62 of the pocket 58, movement of the head portion 72 of the pin 70 toward the central axis of rotation 32 is blocked and the knife 28 is secured relative to the body 30 of the mower disc 26.

It should be appreciated that removal of the knife 28 from the mower disc 26 may be accomplished by performing the above described installation procedure in reverse operation.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A rotary mower system comprising:
   a mower disc having a body rotatable about a central axis of rotation, the body including an upper surface and a lower surface positioned beneath and opposite the upper surface;
   wherein the body extends radially outward from the central axis of rotation and defines an elongated slot passing therethrough, between the upper surface and the lower surface;

a retention block attached to and rotatable with the body, wherein the retention block includes a recessed surface positioned against the upper surface of the body and cooperating with the upper surface to define a pocket therebetween, the pocket including a radially outer portion and a radially inner portion;

wherein the retention block includes a cover portion at least partially covering the elongated slot over the radially outer portion of the pocket;

a pin having a shank portion passing through the elongated slot, wherein the shank portion of the pin is moveable within the elongated slot along a radially extending path relative to the central axis of rotation between the radially outer portion of the pocket and the radially inner portion of the pocket;

wherein the pin includes a head portion attached to the shank portion, with the head portion positioned within the pocket between the retention block and the body of the mower disc, such that the cover portion of the retention block at least partially covers the head portion of the pin to prevent withdrawal of the pin from the elongated slot when the pin is disposed in the radially outer portion of the pocket, and wherein the cover portion does not cover the head portion of the pin when the pin is disposed in the radially inner portion of the pocket to allow vertical movement of the pin relative to the body; and a knife positioned adjacent the lower surface of the body and coupled to the shank portion of the pin.

2. The mower system set forth in claim 1, wherein the elongated slot includes a long dimension defining a first distance and extending radially outward from the central axis of rotation, and a short dimension defining a second distance extending perpendicular to the long dimension, with the first distance of the long dimension greater than the second distance of the short dimension.

3. The mower system set forth in claim 2, wherein the shank portion of the pin defines a diameter that is less than the second distance of the short dimension of the elongated slot.

4. The mower system set forth in claim 2, wherein the head portion of the pin defines a head width parallel to the short dimension of the elongated slot, with the head width greater than the second distance of the short dimension.

5. The mower system set forth in claim 1, wherein the retention block includes an access opening extending from a top surface of the retention block to the recessed surface to provide vertical access to the radially inner portion of the pocket from above.

6. The mower system set forth in claim 5, wherein the access opening includes an opening width greater than a head width of the head portion of the pin.

7. The mower system set forth in claim 5, further comprising an upper plate moveably attached to the body for pivotable movement between an engaged position covering the access opening, and a disengaged position providing access to the access opening from above.

8. The mower system set forth in claim 7, wherein the upper plate includes resilient spring steel plate.

9. The mower system set forth in claim 7, wherein the upper plate includes a protrusion shaped to nest within and penetrate into the access opening when the upper plate is disposed in the engaged position.

10. The mower system set forth in claim 7, wherein the upper plate includes a planar portion having a plate thickness and a bushing having a bushing thickness greater than the plate thickness such that the bushing stands proud of the planar portion.

11. The mower system set forth in claim 10, further comprising a first fastener passing through the planar portion and the bushing, and secured relative to the body.

12. The mower system set forth in claim 1, wherein the pocket defines a pocket width parallel to the short dimension of the elongated slot, with the pocket width greater than a head width of the head portion of the pin.

13. The mower system set forth in claim 1, further comprising a lower support fixedly attached to the body of the mower disc adjacent and below the lower surface of the body.

14. The mower system set forth in claim 13, wherein the lower support includes a knife support portion spaced vertically below the lower surface of the body, with the knife positioned between the body and the knife support portion of the lower support.

15. The mower system set forth in claim 14, wherein the knife support portion defines a support recess, with a distal end of the shank portion of the pin disposed within the support recess when the pin is disposed in the radially outer portion of the pocket.

16. The mower system set forth in claim 15, wherein the knife includes a bore extending therethrough, with the shank portion of the pin passing through the bore of the knife to secure the knife relative to the body.

17. The mower system set forth in claim 15, wherein the support recess includes an elongated shape having a long dimension extending radially outward from the central axis of rotation, and a short dimension extending perpendicular to the long dimension of the support recess, with the long dimension of the support recess greater than the short dimension of the support recess.

18. The mower system set forth in claim 15, wherein the shank portion of the pin defines a diameter that is less than the short dimension of the support recess.

19. A method of attaching a knife to a mower disc of a rotary mower system, wherein the mower disc includes a body rotatable about a central axis of rotation, the method comprising;

providing the mower disc with an elongated slot passing therethrough, between an upper surface and a lower surface of the body, and a retention block attached to and rotatable with the body, wherein the retention block includes a recessed surface positioned against the upper surface of the body and cooperating with the upper surface to define a pocket therebetween, the retention block including a cover portion at least partially covering a radially outer portion of the pocket and the elongated slot;

positioning a knife between the lower surface of the body and a lower support attached to the body, such that a bore of the knife is aligned with the elongated slot and a support recess of the lower support;

inserting a pin through an access opening of the retention block and the elongated slot until a head portion of the pin rests against the upper surface of the body, whereby a shank portion of the pin passes through the bore of the knife and at least partially penetrates into the support recess of the lower support;

moving the pin relative to the body in a direction radially outward and away from the central axis of rotation, so that the head portion of the pin is disposed in the radially outer portion of the pocket such that the cover portion of the retention block at least partially covers the head portion of the pin to prevent withdrawal of the pin from the elongated slot; and blocking movement of the pin along the elongated slot in a direction radially inward and toward the central axis of rotation, after the head portion is disposed in the radially outer portion of the pocket, to secure the pin relative to the body.

20. The method set forth in claim 19, further comprising aligning the shank portion of the pin relative to the retention block, such that the shank portion forms an insertion angle relative to the central axis of rotation and is positioned to pass through the access opening of the retention block and through the radially inner portion of the pocket at the insertion angle.

21. The method set forth in claim 20, further comprising rotating the pin from the insertion angle to substantially parallel the central axis of rotation once the pin is positioned with the shank portion passing through the elongated slot of the body, the bore of the knife, and the support recess of the lower support, and prior to moving the pin into the radially outer portion of the pocket.

22. The method set forth in claim 19, further comprising bending an upper plate vertically upward and away from the mower disc to dislodge a protrusion of the upper plate from interlocking engagement with the access opening of the retention block disposed on the mower disc.

23. The method set forth in claim 22, further comprising moving the upper plate relative to the mower disc when the protrusion is dislodged from the access opening to provide access to the access opening from above.

24. The method set forth in claim 23, wherein blocking movement of the pin along the elongated slot in the direction radially inward and toward the central axis of rotation includes moving the upper plate relative to the mower disc so that the protrusion is aligned with the access opening, whereby a spring force biases the protrusion into interlocking engagement with the access opening and blocks movement of the pin toward the central axis of rotation.

* * * * *